(12) United States Patent
Hatanaka

(10) Patent No.: US 10,377,123 B2
(45) Date of Patent: Aug. 13, 2019

(54) IMAGE PROCESSING DEVICE, IMAGE PROCESSING SYSTEM, NON-TRANSITORY RECORDING MEDIUM, AND METHOD OF MANUFACTURING OBJECT

(71) Applicant: Shinichi Hatanaka, Tokyo (JP)

(72) Inventor: Shinichi Hatanaka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 436 days.

(21) Appl. No.: 14/946,909

(22) Filed: Nov. 20, 2015

(65) Prior Publication Data

US 2016/0151980 A1 Jun. 2, 2016

(30) Foreign Application Priority Data

Dec. 2, 2014 (JP) .................................. 2014-243801

(51) Int. Cl.
| | | |
|---|---|---|
| *B29C 67/00* | (2017.01) | |
| *B33Y 10/00* | (2015.01) | |
| *H04N 1/00* | (2006.01) | |
| *G05B 19/4099* | (2006.01) | |
| *B33Y 50/00* | (2015.01) | |
| *B29C 64/112* | (2017.01) | |

(52) U.S. Cl.
CPC ............... *B33Y 10/00* (2014.12); *B33Y 50/00* (2014.12); *G05B 19/4099* (2013.01); *H04N 1/00827* (2013.01); *B29C 64/112* (2017.08); *G05B 2219/35134* (2013.01); *G05B 2219/49007* (2013.01); *Y02P 90/265* (2015.11)

(58) Field of Classification Search
CPC .............. H04N 1/00827; B29C 64/112; B29C 67/0059; B29C 67/088; B33Y 10/00; B33Y 50/00; G05B 19/4099; G05B 2219/35134; G05B 2219/49007; Y02P 90/265; G06K 15/1818
USPC ................ 700/29, 56, 95, 98, 118, 119, 123
See application file for complete search history.

(56) References Cited

U.S. PATENT DOCUMENTS

| | | | |
|---|---|---|---|
| 7,201,460 B1 * | 4/2007 | Silverbrook | ......... B41J 2/04505 347/12 |
| 2002/0167101 A1 | 11/2002 | Tochimoto et al. | |
| 2009/0033766 A1 * | 2/2009 | Ito | .............................. G06T 1/60 348/231.2 |
| 2010/0027848 A1 * | 2/2010 | Al-Dossary | ............ G01V 1/362 382/109 |

(Continued)

FOREIGN PATENT DOCUMENTS

| | | |
|---|---|---|
| JP | 2000280354 A | 10/2000 |
| JP | 2000-318140 | 11/2000 |

(Continued)

OTHER PUBLICATIONS

Office Action for corresponding Japanese Patent Application No. 2014-243801 dated Oct. 30, 2018.

*Primary Examiner* — Shahed Ahmed
(74) *Attorney, Agent, or Firm* — Harness, Dickey & Pierce, P.L.C.

(57) ABSTRACT

An image processing device includes a data receiver to receive three-dimensional object data of an object and a circuitry to create three-dimensional data from the three-dimensional object data when coloring at least part of a surface of the object, to conduct the coloring to the outer layer of the surface and multiple inner layers of the object.

11 Claims, 6 Drawing Sheets

(56) References Cited

U.S. PATENT DOCUMENTS

| | | | |
|---|---|---|---|
| 2013/0138234 A1* | 5/2013 | Dufort | G06T 19/00 700/98 |
| 2014/0313254 A1 | 10/2014 | Sohgawa | |
| 2015/0254505 A1 | 9/2015 | Sohgawa et al. | |
| 2015/0321468 A1* | 11/2015 | Ikegawa | B41J 2/02 347/78 |
| 2016/0059482 A1* | 3/2016 | Hakkaku | B29C 67/0059 264/401 |
| 2016/0151972 A1* | 6/2016 | Utsunomiya | B29C 67/0059 264/255 |
| 2017/0084079 A1* | 3/2017 | Hamada | G02B 27/22 |

FOREIGN PATENT DOCUMENTS

| | | |
|---|---|---|
| JP | 2013075390 A | 4/2013 |
| JP | 2013-119244 | 6/2013 |
| WO | WO2009/145069 A1 | 12/2009 |

\* cited by examiner

IMAGE PROCESSING DEVICE, IMAGE PROCESSING SYSTEM, NON-TRANSITORY RECORDING MEDIUM, AND METHOD OF MANUFACTURING OBJECT

CROSS-REFERENCE TO RELATED APPLICATIONS

This patent application is based on and claims priority pursuant to 35 U.S.C. § 119 to Japanese Patent Application No. 2014-243801 on Dec. 2, 2014 in the Japan Patent Office, the entire disclosure of which is hereby incorporated by reference herein.

BACKGROUND

Technical Field

The present invention relates to an image processing device, an image processing system, a non-transitory recording medium, and a method of producing an object.

Background Art

Additive manufacturing using an inkjet method is known to produce an object. The additive manufacturing includes discharging an ink, drying or curing the ink to form a layer, and laminating the layers. In one of the known additive manufacturing methods, (solid) objects are manufactured by repeating forming, curing, and laminating layers.

SUMMARY

According to the present invention, provided is an improved image processing device that includes a data receiver to receive three-dimensional object data of an object and a circuitry to create three-dimensional data from the three-dimensional object data when coloring at least part of a surface of the object, to conduct the coloring to the outer layer of the surface and multiple inner layers of the object.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
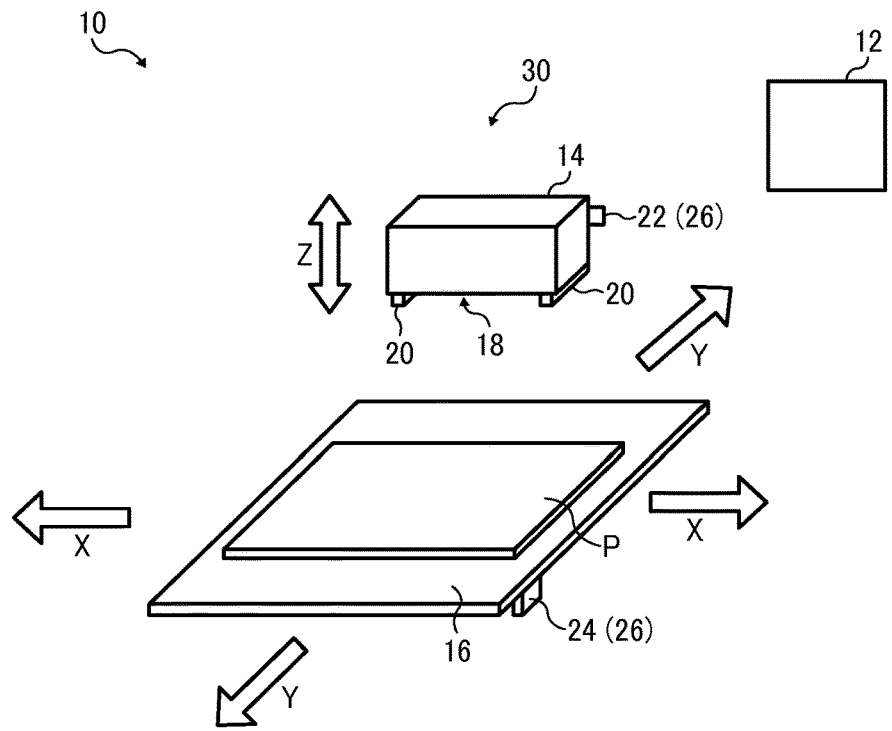
FIG. 1 is a diagram illustrating an example of the image processing system according to an embodiment of the present disclosure.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Preferred embodiments of the present invention are described in detail below with reference to the accompanying drawings. Although the presently preferred embodiments of the present invention are described with various technically preferred limitations, the scope of the invention should not be construed as limited by the embodiments discussed below. It should not be construed that all of elements of the embodiments discussed below are essential to the invention unless specifically stated as such The image processing device, an image processing system, a non-transitory recording medium, and a method of producing a solid object are described with reference to accompanying drawings. Incidentally, it is to be noted that the following embodiments are not limiting the present disclosure and any deletion, addition, modification, change, etc. can be made within a scope in which man in the art can conceive including other embodiments, and any of which is included within the scope of the present disclosure as long as the effect and feature of the present disclosure are demonstrated.

Image Processing System

Figure 2:
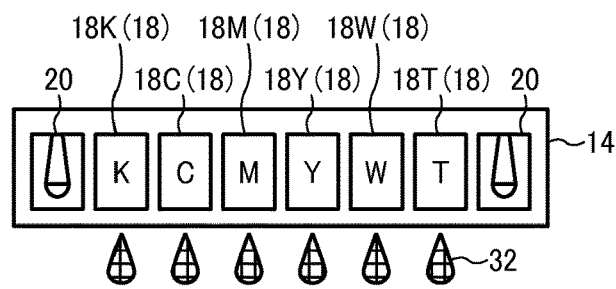
FIG. 2 is a schematic diagram illustrating an additive manufacturing device.
Figure 2:
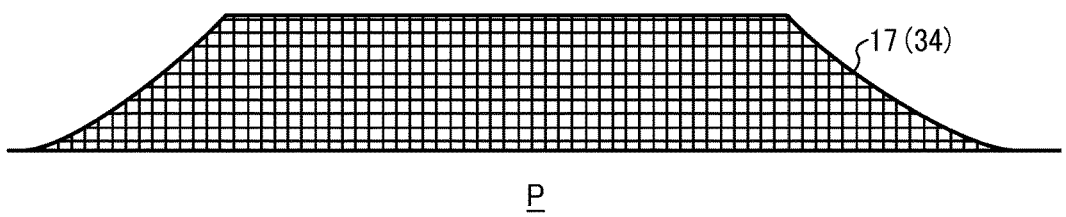

FIG. 1 is a diagram illustrating an example of an image processing system 10. The image processing system 10 includes an image processing device 12 and an additive manufacturing device 30. The image processing device 12 and an additive manufacturing device 30 are communicatively connected to each other. FIG. 2 is a diagram illustrating a recording unit 14 in the additive manufacturing device 30.

The additive manufacturing device 30 includes the recording unit 14, an operation stage 16, and a drive unit 26. The recording unit 14 is an inkjet method recording unit including multiple nozzles 18 and records dots by discharging droplets from each of the nozzles 18. The nozzle 18 is provided on the facing portion of the recording unit 14 to the operation stage 16.

In this embodiment, a droplet 32 in FIG. 2 includes at least an ink droplet and an additional droplet. The ink droplet contains a coloring material for use in image forming. That is, in this embodiment, the image means those formed by ink.

The additional droplet has a color having no impact on the image. The additional droplet is, for example, white or transparent. In addition, the additional droplet may have a similar color to that of a support P of the image forming subject. The support P is an image forming subject of the ink droplets 32. The support P is, for example, a recording medium. In addition, the support P can be formed by discharging droplets utilizing an inkjet method.

The ink droplet and the additional droplet are curable on stimulus. The stimulus is, for example, light (ultraviolet, infrared, etc.), heat, electricity, etc. In this embodiment, a case in which the ink droplet and the additional droplet are ultraviolet curable is described. The ink droplet and the additional droplet are not limited to the case of ultraviolet curable.

An irradiator 20 is provided to the recording unit 14, disposed facing the operation stage 16. The irradiator 20 irradiates the support P with light having a wavelength that cures the ink droplets or the additional droplets discharged from the nozzle 18. In this embodiment, the irradiator 20 emits ultraviolet rays.

The operation stage 16 holds the support P. The drive unit 26 relatively moves the recording unit 14 and the operation stage 16 in the vertical direction (Z direction in FIG. 1), a main scanning direction X perpendicular to the vertical direction Z, and a sub-scanning direction Y perpendicular to the vertical direction Z and the main scanning direction X. In this embodiment, the plane made by the main scanning direction X and the sub-scanning direction Y corresponds to the XY plane of the operation stage 16 along the plane thereof facing the recording unit 14.

The drive unit 26 includes a first drive unit 22 and a second drive unit 24. The first drive unit 22 moves the recording unit 14 in the vertical direction Z, the main scanning direction X, and the sub-scanning direction Y. The second drive unit 24 moves the operation stage 16 in the vertical direction Z, the main scanning direction X, and the sub-scanning direction Y. The additive manufacturing device 30 may have a configuration having only one of the first rive unit 22 and the second drive unit 24.

Next, the additive manufacturing device 30 taking an inkjet method is described. In general, 3D laminating (additive manufacturing) methods utilizing inkjet methods include the powder laminate modeling, the fused-resin deposition modeling, and the optical modeling.

In the powder laminate modeling, a layer made of starch, gypsum powder, or ceramic powder is formed, a binder is discharged on the surface of the layer by inkjet, and the powder is firmly fixed by the binder drawn in accordance with a cross-sectional form, thus forming a solid object. In the fused-resin deposition modeling, fused wax, etc. is discharged by inkjet and the wax, etc. drawn in accordance with a cross-sectional form is solidified, thus forming a solid object. In the optical modeling, a liquid light-curable resin is discharged by inkjet to form a layer and the layer of the light-curable resin is cured by light applied in accordance with a cross-sectional form, thus forming a solid object.

The additive manufacturing device 30 of this embodiment is not particularly limited, for example, they are preferred when they can form a colored layer 60, which is described later. Therefore, the device utilizing an inkjet method is not particularly limited. In particular, it is preferable to utilize the optical modeling in which a solid object is manufactured by discharging ink of a light-curable resin and curing the resin upon application of light.

FIG. 2 is a diagram illustrating an example of the additive manufacturing device 30 that suitably executes this embodiment. The recording unit 14 in the additive manufacturing device 30 has a configuration having multiple nozzles 18 arranged in a direction. Each nozzle 18 discharges ink droplets, additional droplets, or a liquid mixture thereof as the droplet 32. The nozzle 18 and the configuration to discharge the droplets are the same as those of known inkjet methods.

In this embodiment, a nozzle 18K, a nozzle 18C, a nozzle 18M, a nozzle 18Y, a nozzle 18W, and a nozzle 18T are arranged in the direction. The nozzle 18 including the nozzle 18K, the nozzle 18C, the nozzle 18M, and the nozzle 18Y discharges the ink droplets. Specifically, the nozzle 18K discharges the ink droplets of black, the nozzle 18C discharges the ink droplets of cyan, the nozzle 18M discharges the ink droplets of magenta, and the nozzle 18Y discharges the ink droplets of yellow. The nozzle 18W and the nozzle 18T of the nozzle 18 discharge the additional droplets. Specifically, the nozzle 18W discharges white additional droplets and the nozzle 18T discharges transparent additional droplets.

By discharging the droplet 32 from each of the nozzles 18, dots 34 corresponding to the droplet 32 are formed on the support P so that an image 17 is formed by the coloring material contained in the ink droplets 32. In addition, by discharging and laminating the droplet 32, the dot 34 is laminated to form the image 17 of an object.

In FIG. 2, each nozzle 18 discharges the droplets 32 of only a single color (one kind). However, each nozzle 18 may discharge a liquid mixture of multiple kinds of the liquid droplets 32. In addition, the color of the ink discharged from the recording unit 14 is not limited to black, cyan, magenta, and yellow. In addition, the kind of the droplets 32 discharged from the recording unit 14 is not limited to the six kinds (black, cyan, magenta, yellow, white, and transparent).

In this embodiment, irradiators 20 are provided on both ends of the recording unit 14 in the arrangement direction of the nozzle 18K, the nozzle 18C, the nozzle 18M, the nozzle 18Y, the nozzle 18W, and the nozzle 18T. The droplet 32 discharged from each nozzle 18 is cured upon application of light emitted from the irradiator 20.

It is preferable to arrange the irradiator 20 around the nozzle 18. This arrangement makes it possible to reduce the curing time to be taken from landing of the droplets 32 discharged from each nozzle 18 on the support P to curing. As a result, finer images are obtained. The number and the position of the irradiator 20 are not limited to those illustrated in FIG. 2.

In addition, as illustrated in FIG. 1, the additive manufacturing device 30 forms dot 34 by the droplet 32 on the support P and laminates the dot 34 by relatively moving the recording unit 14 and the support P while discharging the droplet 32 from the nozzle 18 of the recording unit 14. The support P may be planar or a solid form having rough surface.

Figure 3:
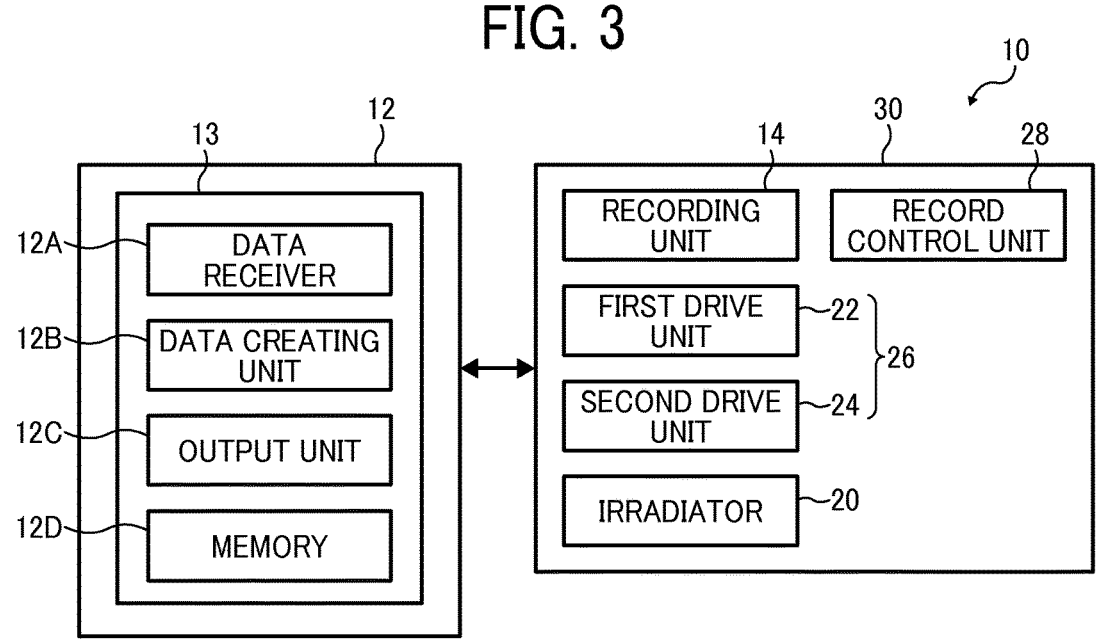
FIG. 3 is a function block diagram illustrating an example of the image processing system according to an embodiment of the present disclosure.

FIG. 3 is a function block chart illustrating the image processing system 10. The additive manufacturing device 30 includes the recording unit 14, a record control unit 28, the drive unit 26, and the irradiator 20. The descriptions of the recording unit 14, the drive unit 26, and the irradiator 20 are omitted since these are already described above.

The record control unit 28 receives print data from the image processing device 12. The record control unit 28 controls the recording unit 14, the drive unit 26, and the irradiator 20 in order to discharge the droplet 32 corresponding to each pixel from the nozzle 18 in accordance with the received print data.

The image processing device 12 includes a main control unit 13. The main control unit 13 is a computer, which has a configuration including a central processing unit (CPU), etc. and controls the entire of the image processing device 12. The main control unit 13 may have a configuration including no general purpose CPU. For example, the main control unit 13 may be configured by a circuit.

The main control unit 13 includes a data receiver 12A, a data creating unit 12B, an output unit 12C, and a memory 12D. Part or the entire of these data receiver 12A, the data creating unit 12B, and the output unit 12C can be performed by executing programs, i.e., software, by a processing device such as a CPU, hardware such as an integrated circuit (IC), or a combination of software and hardware.

The data receiver 12A receives three-dimensional object data of a (solid) object. The three-dimensional object data are information about shapes, color, etc. of the object to be formed. The data receiver 12A acquires image data from external devices via a communication unit or from the memory 12D provided to the image processing device 12.

The data creating unit 12B creates three-dimensional data from the three-dimensional object data when at least part of the surface of a (solid) object is subject to coloring. The coloring is applied to the outer layer (surface layer) and multiple inner layers located inside of the object. It is preferable that the outer layer and the multiple inner layers are adjacent to each other. This is deferred in detail.

Figure 4:
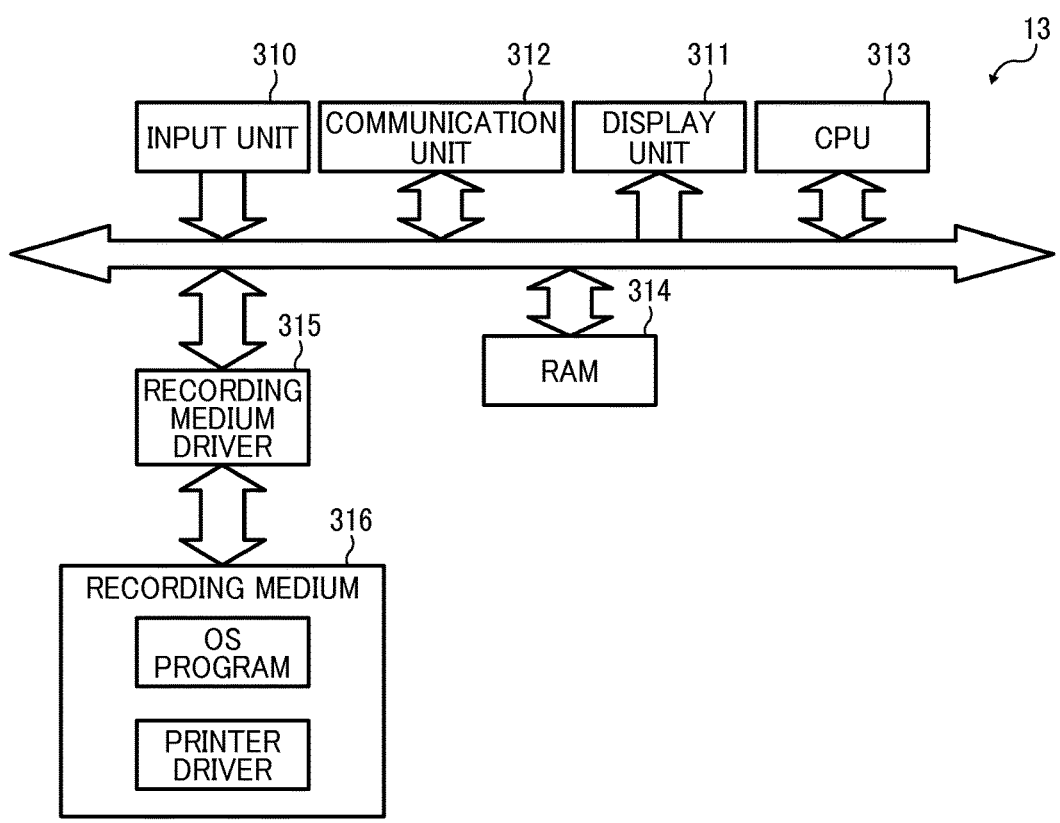
FIG. 4 is a diagram illustrating an example of the hardware configuration of the main control unit in the image processing system according to an embodiment of the present disclosure.

Next, the hardware configuration of the main control unit 13 in this embodiment is described. FIG. 4 is a block diagram illustrating an example of the schematic configuration of the main control unit 13. The main control unit 13 includes an input unit 310 to input data, a display unit 311 such as a display, a communication unit 312 to conduct data communication, a CPU 313 serving as a control unit to control the entire of the device, a RAM 314 used as the working area of the CPU 313, a recording medium driver 315 to read and/or write data of the recording medium, and a recording medium 316 to store various programs to operate the CPU 313.

The input unit 310 includes a cursor key, number keys, a keyboard having various function keys, and a mouse and a slice pad to select a key on the display of the display unit 311. The input unit 310 is a user interface where a user provides an instruction of an operation to the CPU 313 and inputs data.

The display 311 includes a cathode-ray tube (CRT) and light-emitting display (LED) and displays display data input from the CPU 313. The communication unit 312 is to conduct data communication with exterior such as a printer via a cable.

The CPU 313 is a central processing unit to control the entire device according to the program stored in the recording medium 316. The CPU 313 is connected with the input unit 310, the display unit 311, the communication unit 312, the RAM 314, the recording medium driver 315, etc. to control data communication, read-out of application programs and read/write of various data by access to the memory, input of data and command, and display.

In addition, the CPU 313 sends out three-dimensional data to form an object to the additive manufacturing device 30 via the communication unit 312 based on the three-dimensional object data input from the input unit 310.

The RAM 314 has a work memory to store designated programs, input instructions, input data, and processing results and a display memory to temporarily store display data to be displayed on the display screen of the display unit 311.

The recording medium 316 stores various programs and data such as an operating system program (e.g., Windows™ of Microsoft Corporation) executable by the CPU 313 and a printer driver corresponding to the additive manufacturing device 30. The recording medium 316 includes optical, magnetic, and electric recording media such as floppy Disks™, hard disks, CD-ROMs, DVD-ROMs, MOs, and PC cards.

The various programs are stored in the recording medium 316 in data form the CPU 311 can read. In addition, the various programs may be recorded in the recording medium 316 in advance or stored in the recording medium 316 by downloading via a communication line such as the internet.

Solid (Three-Dimensional) Object

Figure 5:
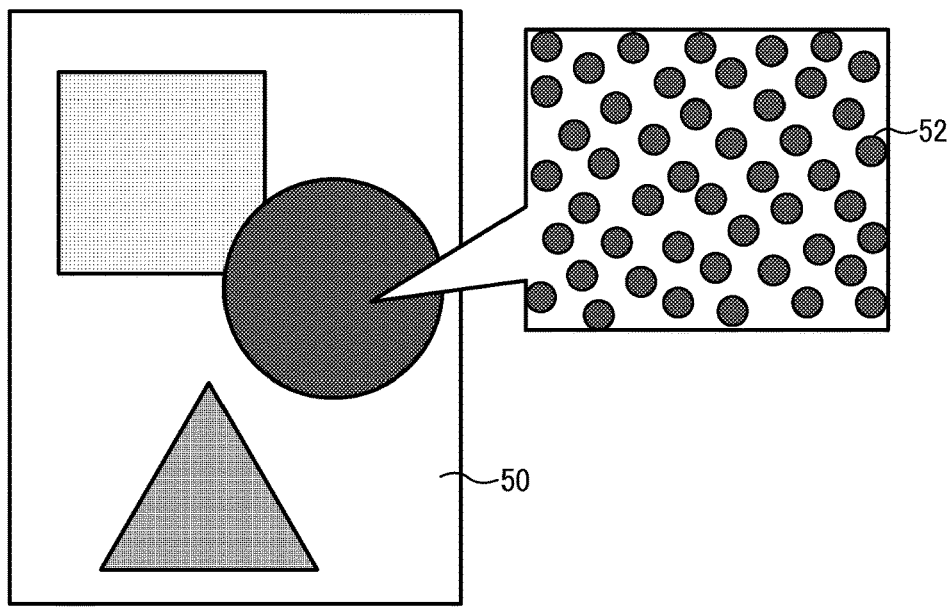
FIG. 5 is an enlarged schematic view of a typical print product utilizing an inkjet recording method.

FIG. 5 is a schematic view of a typical print product utilizing an inkjet recording method and an enlarged schematic views thereof. In conventional printing utilizing an inkjet method, images are formed by juxtaposition color mixture by arranging ultra small ink droplets 52 on a sheet 50 as illustrated in the enlarged diagram in FIG. 5.

In this juxtaposition color mixture, as the density of the ink droplets per unit of area is reduced, a thin image is formed. As the density of the ink droplets per unit of area is increased, a thick image is formed. Also, for example, if a recording device utilizing an inkjet method that contains four color ink of cyan (C), magenta (M), yellow (Y), and black (K), the color of an image can be changed by color mixture such that a blue (B) image can be formed by using the C ink and M ink at the same time or a red (R) image can be formed by using the M ink and Y ink at the same time.

Figure 6:
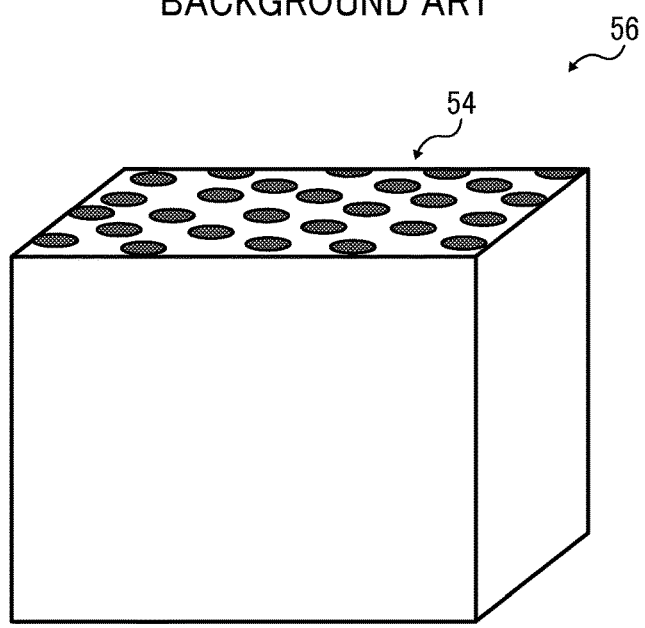
FIG. 6 is a schematic diagram illustrating an example of the (solid) object manufactured by a conventional manufacturing method.

Next, an example of the object formed utilizing known technologies is illustrated in FIG. 6. FIG. 6 is a schematic diagram illustrating the state in which the surface of the upper portion of a three-dimensional object 56 is colored. In FIG. 6, a surface 54 is colored and located on the upper portion of the three-dimensional object. The coloring of the three-dimensional object 56 takes the same juxtaposition color mixture method as the plane illustrated in FIG. 5.

Like the example illustrated in FIG. 6, there are a method of attaching color ink to the surface of a manufactured three-dimensional form or a method of coating the surface with white ink after manufacturing a three-dimensional form followed by attachment of color ink thereto. White is the base ink in this case because the color representation by coloring is subtractive color mixture. Depending on the representation method of a finally-manufactured three-dimensional object, other colors or transparent may be used.

Figure 7:
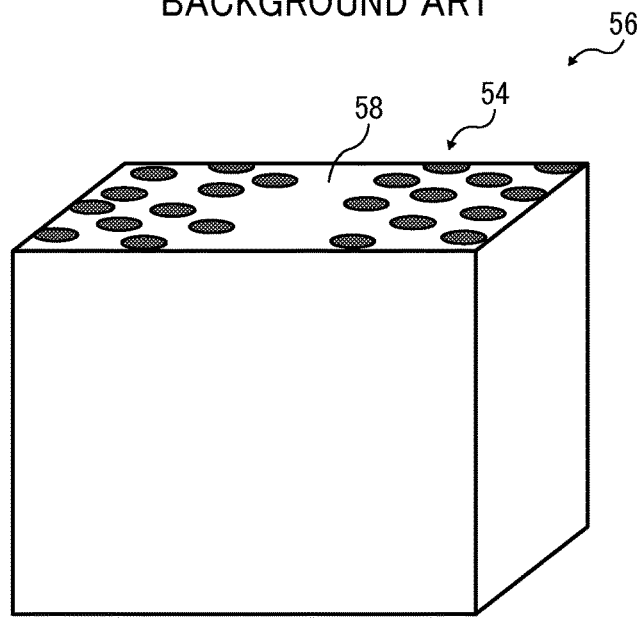
FIG. 7 is a schematic diagram illustrating the uncolored area in an example of the (solid) object manufactured by a conventional manufacturing method.

FIG. 7 is a schematic diagram illustrating the state in which a streak ink unattached area 58 occurs due to non-discharging of ink during coloring in known technologies. As the problem peculiar to the inkjet method, there are non-discharging due to clogging of nozzles through which ink is discharged and non-uniform discharging curve in the jetting direction of discharged ink occurring to multiple nozzles. Such kinds of problems occurring during coloring cause the ink unattached area 58 as illustrated in FIG. 7 so that the underlayer is bare in this area and the color of the support (background) is exposed. This causes deterioration of the surface coloring of the finally-manufactured three-dimensional object. In addition, in the known technology in which coloring is conducted after a three-dimensional object is manufactured, if the surface of the object chips off or is scraped off, the color of the base (background) appears, that is, the state as illustrated in FIG. 7.

Next, the three-dimensional object obtained according to an embodiment of the present disclosure is described. The object obtained according to the embodiment is manufactured in accordance with the three-dimensional data for the three-dimensional object having a partially or entirely colored surface. The coloring is applied to the outer layer and multiple inner layers inside of the object. In this embodiment, the outer layer and multiple inner layers are adjacent to each other.

Figure 8:
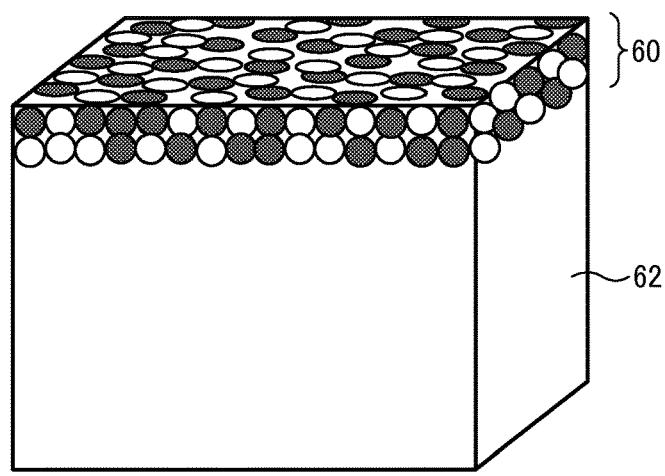
FIG. 8 is a schematic diagram illustrating an example of the (solid) object manufactured according to an embodiment of the present disclosure.

FIG. 8 is a schematic diagram illustrating an example of a three-dimensional object obtained according to this embodiment. The outer layer and the multiple inner layers of the object illustrated in FIG. 8 are colored. Since the outer layer and the multiple inner layers are colored, these are referred to as the colored layer 60 as a whole. In FIG. 8, the colored layer 60 is formed only on the upper part of the three-dimensional object but it is possible to form the colored layer 60 on the side or the base thereof.

As for the three-dimensional object obtained according to this embodiment, when an inkjet additive manufacturing device manufactures a three-dimensional object, only the inside of the colored layer 60 of the object becomes bare so that the color of the underlayer (background) of the object is not exposed even if defective discharging or insufficient accuracy of inkjet heads occurs. In addition, if part of the surface of the object chips off or is scraped off, only the inside of the colored layer is exposed so that the color of the surface is free from the impact of such chip-off.

Next, a monochrome object manufactured using white ink and black ink is described. The part located on the inner side of the colored layer 60 is referred to as a rough part 62 in FIG. 8. Since the rough part 62, which is located on the inner side of the colored layer 60, is also the inside of the object and not visible, the color of ink of the rough part 62 does not matter. In this embodiment, it is preferable that white ink is used for the rough part 62 in terms of final visibility. White ink makes the color of the colored layer 60 more visible.

When the outer layer is colored in gray, black ink is attached to the surface of a white object with a ratio of 50 percent in conventional technologies.

In this embodiment, each layer of the colored layer 60 has the same ink ratio to represent the color of the outer. When the outer layer is colored in gray, each layer of the colored layer 60 is constituted of 50 percent white ink and 50 percent black ink. In this embodiment, the three-dimensional shape of an object is formed while including the colored layer 60.

In addition, the colored layer 60 is formed of multiple colored layers but the color of the outer layer (surface) may look cloudy and dark depending on the number of the layers and the color. In such a case, it is desirable to change the ink ratio for each layer in order that the color of the surface of the object is finally a desired one. Accordingly, in the example in which the outer layer is colored in gray, it is possible to change the ratio of the 50 percent white ink and 50 percent black ink in each layer of the colored layer 60 on a necessity basis.

That is, the color of each layer in the colored layer 60 is not necessarily identical to the color of the outer layer. Significantly same colors are allowed, meaning that the ink ratio can be changed in the depth direction of the layers within the scope of the present disclosure. With regard to the ink ratio, it is possible to have optimal values in accordance with the ink components, thickness of a colored layer, a number of overlaid layers, etc. in advance as the internal data and apply these values when creating data of each layer.

With regard to the thickness around the surface formed as the colored layer 60, it changes depending on the assumptions as described above. Also, the number of the multiple inner layers to be overlaid changes according to the thickness of each colored layer. Moreover, the number of layers and thickness may be changed depending on the position in the colored layer 60.

Therefore, the thickness of the colored layer 60 can be changed to each application but is preferably 50 μm or more and more preferably 100 μm or more. In this range, the color of the underlayer (background) is not exposed due to an external factor such that part of the colored layer chips off, so that the color can be maintained. However, if the colored layer 60 is excessively thick, the color may become dull.

Figure 9:
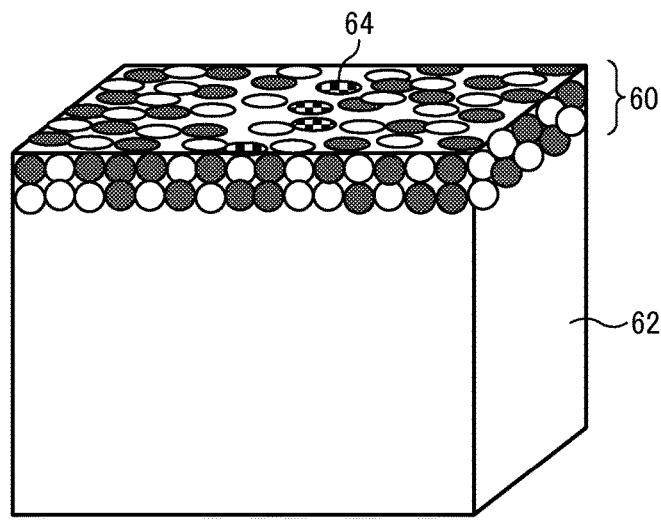
FIG. 9 is a schematic diagram illustrating an example of the solid object having an uncolored area manufactured according to an embodiment of the present disclosure.

FIG. 9 is a schematic diagram illustrating an example of the object obtained according to the embodiment in which the uncolored area 64 occurs. FIG. 9 is a diagram illustrating an object having the colored layer 60 on the rough part 62 of white ink and the surface of the colored layer 60 includes a streaky uncolored area 64 due to undischarging of ink by a head. If the problem such as non-discharging or discharging curve peculiar to the inkjet method occurs in this embodiment, the quality of each manufactured layer possibly becomes non-uniform.

However, if the uncolored (non-ink attached) area 64 occurs, other layers of the colored layer 60 are present below the area 64, so that the coloring quality does not visibly deteriorate from the surface. That is, the color of the underlayer (background) is not seen even in the area where no ink is attached. In addition to the problem such as non-discharging or discharging curve peculiar to the inkjet method, the object manufactured according to this embodiment sustains the surface coloring property in cases where the surface of a completely manufactured object is scraped by damage or polished or dissolved to improve the smoothness of the surface.

Next, the dot arrangement pattern of the colored layer 60 is described. In the object obtained according to the embodiment, at least one layer of the multiple inner layers has a dot arrangement pattern different from that of the outer layer.

Figure 10A:
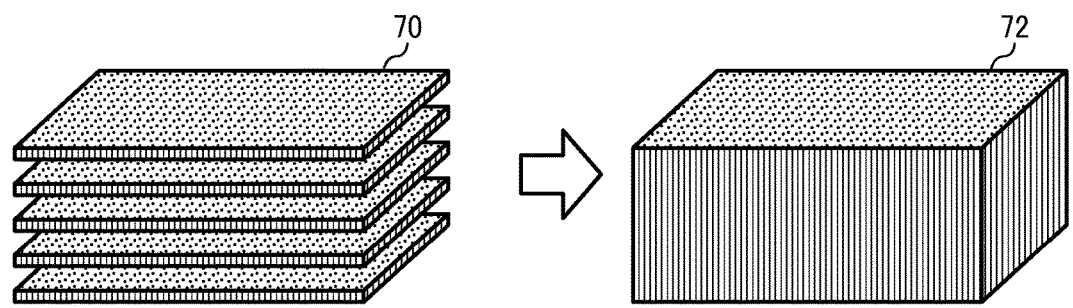
FIGS. 10A and 10B are schematic diagrams illustrating an example of the (solid) object with ink positions of colored layers manufactured according to an embodiment of the present disclosure.
Figure 10B:
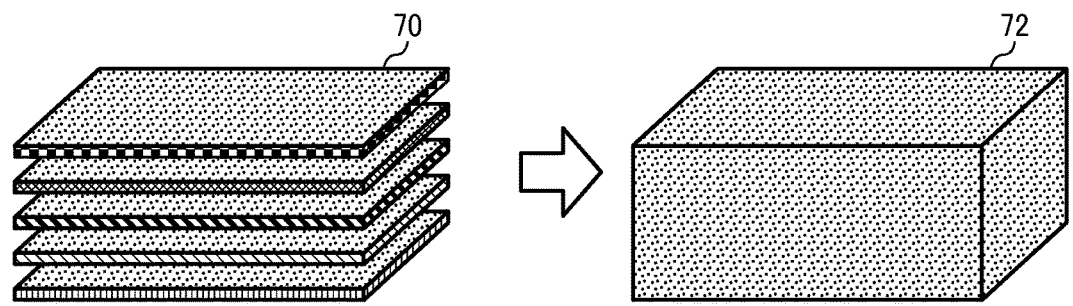

FIGS. 10A and 10B are schematic diagrams illustrating the ink arrangement of the colored layer 60. FIGS. 10A and 10B are schematic diagrams illustrating that an object 72 is manufactured by combining layers 70 in the colored layer 60.

For example, when the surface is colored in gray and the arrangement of white ink and black ink in the colored layer 60 is identical in each layer, the same ink is combined in the overlying direction as illustrated in FIG. 10A, so that the side may be seen having streaks.

In this regard, as illustrated in FIG. 10B, it is preferable to make the ink arrangement in the colored layer 60 different among each layer, thereby to disperse the arrangement of ink droplets in the overlying direction. As a result, the dot arrangement pattern is different for each layer in the colored layer 60, which can reduce the occurrence of vertical streaks.

As the method of making the ink arrangement of each colored layer, there are two methods of A and B. The method A includes creating dot arrangement data of the entire of an object first and thereafter slicing them to obtain the dot arrangement of each layer and the method B includes creating dot arrangement data for each layer.

In the method A, three-dimensional dot arrangement pattern of an object is created first and thereafter slice data for a layer to be manufactured is created. Based on this, the layer to be manufactured is manufactured by the additive manufacturing device 30. Thereafter, the slice data for the next layer is formed. This process is repeated.

In the method A, the three-dimensional dot arrangement pattern is prepared in advance, which is applied thereafter. Alternatively, an error diffusion method using a three-dimensional weight matrix is applied. In addition, it is possible to use three-dimensional dithermatrix.

Known methods can be used as the error diffusion method and also known methods can be used to create dithermatrix.

In the method B, after creating slice data for layers to be manufactured, two-dimensional dot arrangement pattern is created and thereafter the layer is manufactured by the additive manufacturing device 30 based on the created pattern. Thereafter, the slice data for the next layer is formed. This process is repeated. For the method B, there are a method of rotating a predetermined dot arrangement pattern, a simple method of parallel shift, and a method of making a difference about random property by imparting noises by using random patterns such as error diffusion.

The method of rotating the pattern includes rotating the dot arrangement pattern for each layer of the colored layer 60 with no particular limit to the rotation angle. In addition, the simple method of parallel shift includes making a parallel shift to dot arrangement patterns for each layer of the colored layer 60 with no particular limit to the shift distance. That is, the dot arrangement pattern is made different by rotation and/or parallel shift of the dot arrangement pattern for each layer inside the outer layer. Known methods are available for the method of differentiating the random property. Random patterns such as the error diffusion method are created for each layer in the colored layer 60. At the time of creating the pattern, the dot arrangement patterns can be made different for each layer in the colored layer 60 by changing noise arrangements that cause random patterns for each layer.

These methods can be used in combination. Of these methods, the three-dimensional dithermatrix makes it possible to reduce the burden of processing of the image processing device 12. In addition, in the case where the noise arrangement causing the random pattern is changed for each layer of the multiple inner layers, the burden of processing of the image processing device 12 is also lessened.

Flow Chart

Figure 11:
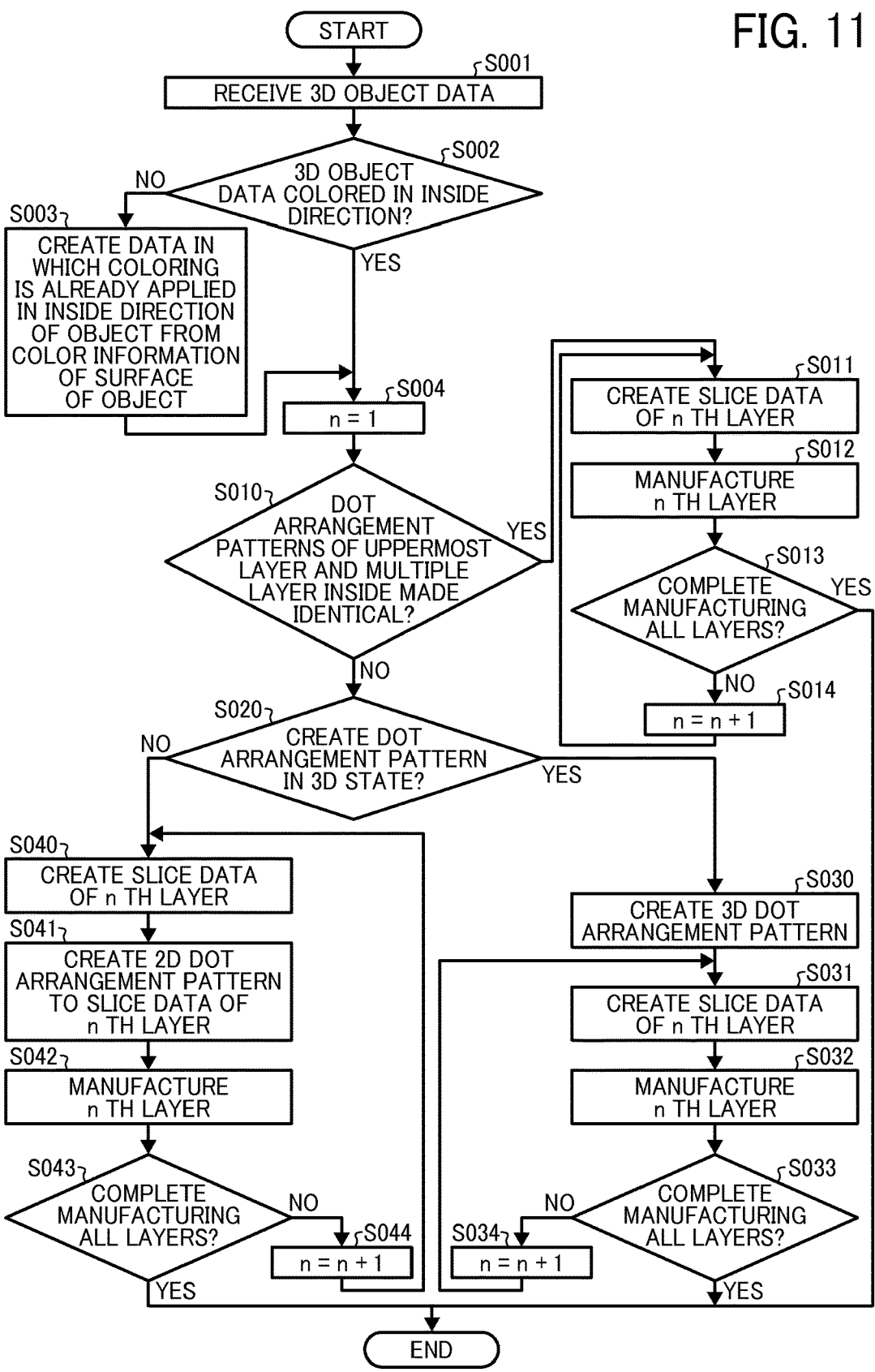
FIG. 11 is a flow chart illustrating an example of the image processing procedure according to an embodiment of the present disclosure.

FIG. 11 is a flow chart illustrating an example of processing of manufacturing an object according to the embodiment of the present disclosure.

First, the data receiver 12A receives three-dimensional object data of a solid object (Step S001). The image processing device 12 determines whether the received three-dimensional object data are data in which the outer layer of the surface to be colored and the multiple inner layer in the object are already colored (Step S002). That is, whether there is the colored layer 60 is present is determined.

If the data are the case in which the multiple inner layer are not colored yet (Step S002, no), the data creating unit 12B creates three-dimensional data in which the coloring is already applied to the multiple inner layer from the color information for the outer layer of the surface to be colored (Step S003).

When the received three-dimensional object data are data in which the coloring is already applied in the inside direction of the outer layer (Step S002, yes), the received three-dimensional object data is treated as three-dimensional data. That is, in this embodiment, the three-dimensional object data the data receiver 12A receives may be three-dimensional data in which the outer layer and the multiple inner layer are already colored. In this case, the three-dimensional object data are subject to further processing as the three-dimensional data.

After the step S003, or in the case of the data in which the multiple inner layer are already colored according to the determination of the Step S002 (Step S002, yes), n is set to 1 (Step S004) to manufacture the first layer of the object.

Thereafter, whether the dot arrangement pattern of the outer layer of the surface to be colored is made identical to the dot arrangement pattern of the layers located on the inner side of the outer layer (Step S010) is determined.

When the dot arrangement patterns are made identical (Step S010, yes), the slice data of the nth layer is created based on the three-dimensional data first (Step S011). Based on the slice data, the nth layer is manufactured by the additive manufacturing device 30 (Step S012).

Thereafter, whether all the layers are manufactured is determined (Step S013) and if yes, the processing is terminated. If no, n is increased by one (Step S014) and the processing of creating slice data of the nth layer (Step S011) and the processing thereafter are repeated. The thus-obtained object has the same dot arrangement in each layer as illustrated in FIG. 10A.

If the dot arrangement patterns are made different (Step S010, no), whether to create the dot arrangement patterns in the three-dimensional state is determined about the object to be manufactured (Step S020).

When the dot arrangement patterns are created in the three-dimensional state (Step S020, yes), the dot arrangement patterns are created in the three-dimensional arrangement pattern first based on the three-dimensional data (Step S030).

Thereafter, the slice data of the nth layer is created based on the created dot arrangement (arrangement) pattern in the three-dimensional state (Step S031).

Based on the slice data, the nth layer is manufactured by the additive manufacturing device 30 (Step S032).

Thereafter, whether all the layers are manufactured is determined (Step S033) and if yes, the processing is terminated. If no, n is increased by one (Step S034) and the processing of creating slice data of the nth layer (Step S031) and the processing thereafter are repeated. The thus-obtained object has the dot arrangement different in each layer as illustrated in FIG. 10B.

When the dot arrangement patterns are not created in the three-dimensional state (Step S020, no), the slice data of the nth layer is created based on the three-dimensional data first (Step S040). A two-dimensional dot arrangement pattern is created to the slice data (Step S041). Based on the two-dimensional dot arrangement pattern and the slice data of the nth layer, the nth layer is manufactured by the additive manufacturing device 30 (Step S042).

Thereafter, whether all the layers are manufactured is determined (Step S043) and if yes, the processing is terminated. If no, n is increased by one (Step S044) and the processing of creating slice data of the nth layer (Step S040) and the processing thereafter are repeated.

The thus-obtained object has the dot arrangement different in each layer as illustrated in FIG. 10B.

Other Embodiment

The image processing device according to an embodiment of the present disclosure is described in detail. The same descriptions described above are omitted. In this embodiment, the image processing device is to process data for use in coloring an object already manufactured by an inkjet additive manufacturing device and includes a data receiver to receive three-dimensional object data of the object and a data creating unit to create three-dimensional data from the three-dimensional object data when at least part of the surface of the object is subject to coloring, which is applied to the outer layer of the surface and multiple inner layers in the object. Preferably, the outer layer and the multiple inner layers are adjacent to each other.

In this embodiment, even when coloring an object that is already manufactured, the coloring is applied to the outer layer of the surface and the multiple inner layers in the object.

Accordingly, if defective discharging or insufficient accuracy of inkjet heads occurs, the color of the underlayer of the object is not visible. Also, if part of the surface of the object chips off or is scraped off, the color of the surface is not damaged.

According to the present disclosure, an image processing device is provided to improve the quality of the object without exposing the color of the underlayer of the object when an inkjet additive manufacturing device manufactures an object.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

According to the present disclosure, an operation control based on operation noises of an apparatus is provided to reduce the level of discomfort caused by the operation noise and improve utility of the device while securing safety of the entire of the apparatus.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An image processing device comprising:
    memory storing computer-readable instructions; and
    one or more processors configured to execute the computer-readable instructions such that the one or more processors are configured to perform operations including
        receiving three-dimensional object data of a three dimensional object having a colored layer composed of an outermost layer and multiple inner layers;
        determining if the multiple inner layers of the three dimensional object has a color based on the received three-dimensional object data and when it is determined that the multiple inner layers have no color, creating data to color the multiple inner layers;
        determining whether the outermost layer of a surface and at least one of multiple inner layers of the three-dimensional object have an identical dot pattern and whether the outermost layer of the surface and at least one of the multiple inner layers have different dot patterns; and creating different dot pattern arrangements throughout the multiple inner layers and creating three-dimensional print data from the three-dimensional object data when coloring at least part of a surface of the object, conducting the coloring to the outermost layer of the surface and when coloring multiple inner layers of the object.

2. The image processing device according to claim 1, wherein the one or more processors are further configured to create three dimensional print data whereby the outermost layer and the multiple inner layers are adjacent to each other.

3. The image processing device according to claim 1, wherein the one or more processors are further configured to create three dimensional print data whereby a thickness of the outermost layer and the multiple inner layers is not less than 50 μm.

4. The image processing device according to claim 1, wherein the one or more processors are further configured to create three dimensional print data whereby at least one layer of the multiple inner layers has a dot arrangement pattern different from that of the outermost layer.

5. The image processing device according to claim 4, wherein the three-dimensional data are created by using three dimensional dithermatrix that regulates dot arrangement.

6. The image processing device according to claim 4, wherein the three-dimensional data are created by an error diffusion method using a three-dimensional weight matrix.

7. The image processing device according to claim 4, wherein the three-dimensional data are created by changing noise positions that generates a random pattern for each of the multiple inner layers.

8. The image processing device according to claim 4, wherein the three-dimensional data are created by at least rotating or parallel-shifting the dot arrangement pattern for each of the multiple inner layers.

9. An image processing system comprising:
the image processing device of claim 1; and
an additive manufacturing device to manufacture the object based on the three-dimensional data created by the image processing device.

10. A non-transitory recording medium storing a plurality of instructions which, when executed by one or more processors, cause the processors to perform a control method of an image processing device, comprising:
receiving three-dimensional object data of a three dimensional object having a colored layer composed of an outermost layer and multiple inner layers;
determining if the multiple inner layers inner layer of the three dimensional object has a color based on the three-dimensional object data and when it is determined that the multiple inner layers have no color, creating data to color the multiple inner layers;
determining whether the outermost layer of a surface of the object and at least one of multiple inner layers of the object have an identical dot pattern and whether the outermost layer of the surface and at least one of the multiple inner layers have different dot patterns, and
creating different dot pattern arrangements throughout the multiple inner layers and creating three-dimensional data from the three-dimensional object data when at least part of a surface of the object is subject to coloring, applying the coloring to the outermost layer of the surface and multiple inner layers of the object.

11. A method of manufacturing an object comprising:
receiving three-dimensional object data of the object having a colored layer composed of an outermost layer and multiple inner layers;
determining if the multiple inner layers of the three dimensional object has a color based on the three-dimensional object data and when it is determined that the multiple inner layers have no color, creating data to color the multiple inner layers;
determining whether the outermost layer of a surface of the object and at least one of multiple inner layers of the object have an identical dot pattern and whether the outermost layer of the surface and at least one of the multiple inner layers have different dot patterns;
creating different dot pattern arrangements throughout the multiple inner layers and creating three-dimensional data from the three-dimensional object data when coloring at least part of a surface of the object, to conduct the coloring to the outermost layer of the surface and multiple inner layers of the object; and
manufacturing the object based on the three-dimensional data.

* * * * *